US005492298A

United States Patent [19]
Walker

[11] Patent Number: 5,492,298
[45] Date of Patent: Feb. 20, 1996

[54] ERGONOMIC MOUSE PAD

[76] Inventor: Lyn E. Walker, 4716 Vista, Belmont Shore, Calif. 90803

[21] Appl. No.: 340,076

[22] Filed: Nov. 15, 1994

[51] Int. Cl.$^6$ .................................................. A47B 91/00
[52] U.S. Cl. ..................... 248/346.01; 248/918
[58] Field of Search ................... 248/346, 118, 248/118.1, 118.3, 118.5, 918; 400/715

[56] References Cited

U.S. PATENT DOCUMENTS 5,195,705  3/1993  Kline et al. ..................... 248/118 X Primary Examiner—Ramon O. Ramirez
Attorney, Agent, or Firm—Curtis L. Harrington

[57] ABSTRACT

An inclined mouse pad is configured as a wedge, and further equipped with a working surface and a decorative surface. When not in use, the working surface can be oriented downwardly against a table to expose the non-working surfaces to view. This protects the working surface from dust and damage from dropped objects and spills. The inclined mouse pad provides a gravity gradient in one direction, preferably the "Y" direction to give normal physiological feed back on the position of the mouse on the pad. Other advantages include ergonomic compatibility, elevation of the arm, and better control since the user pushes upward and pulls the mouse downward.

18 Claims, 4 Drawing Sheets

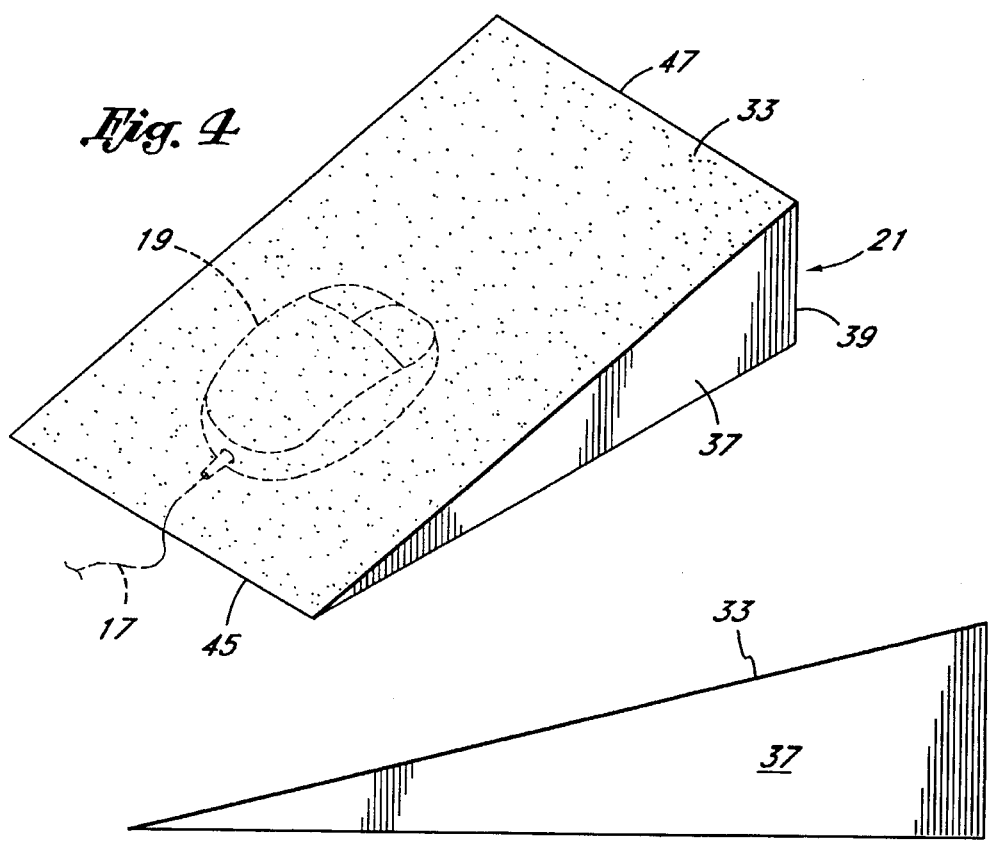
Fig. 4
Fig. 5
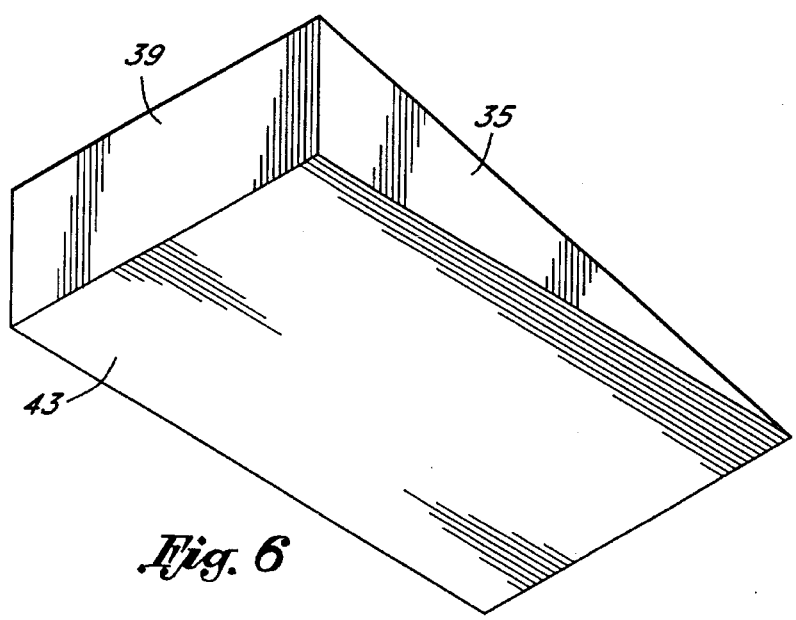
Fig. 6

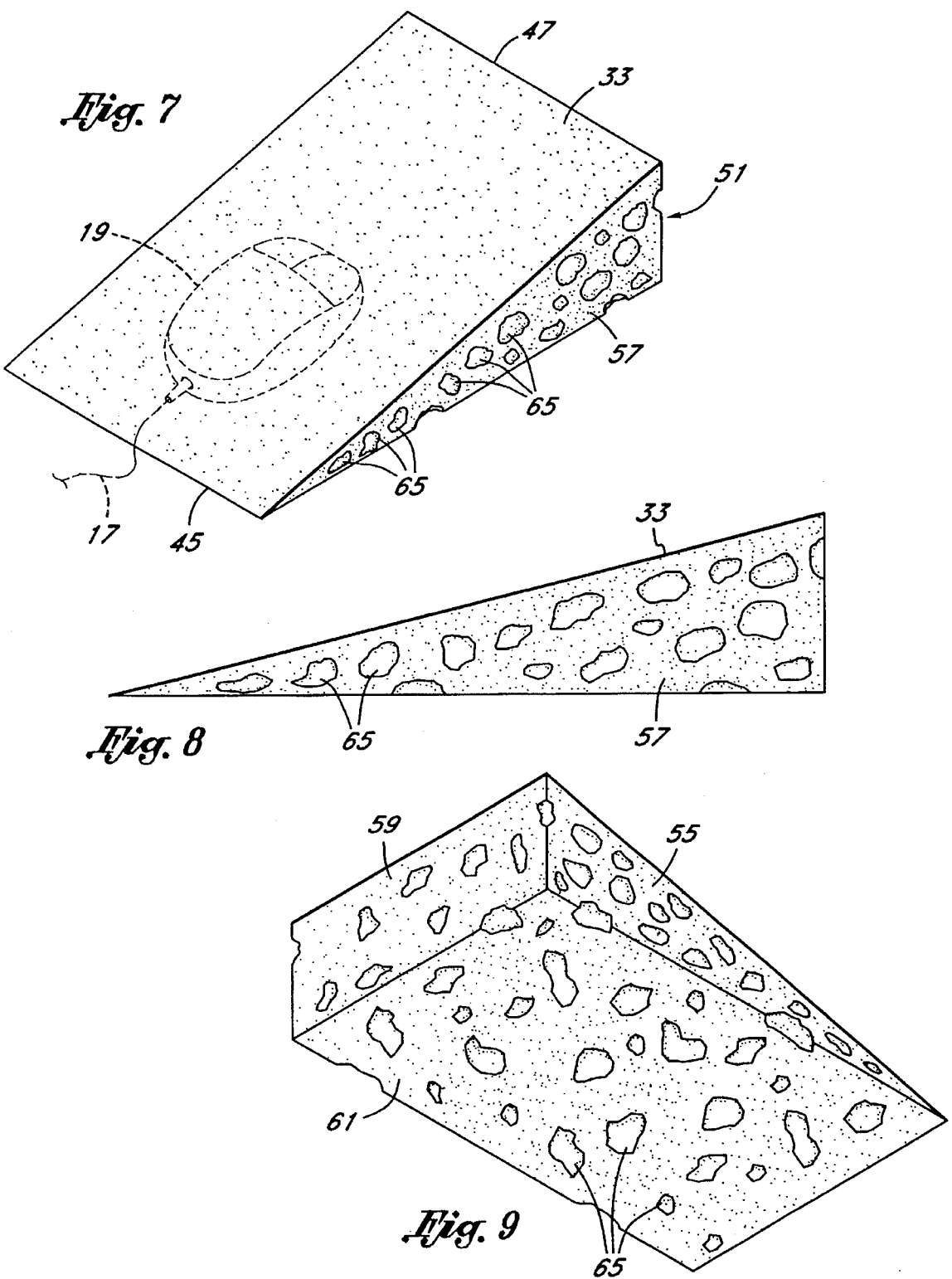

ERGONOMIC MOUSE PAD

FIELD OF THE INVENTION

The present invention relates to the field of computer equipment and peripherals, and particularly to an inclined board for use with a manual manipulator mouse, and which may have a utility surface decorative non-utility surfaces.

BACKGROUND OF THE INVENTION

Computers are increasingly used with a cursor indicator which as popularly become known as a mouse. A mouse is typically a device designed to be grasped by the human palm and moved about on a surface. Movement on the surface will cause a computer screen cursor to move about in a like manner.

Some mouse instruments have a laser interaction with a specialized board, while others have an electromagnetic relationship with a tablet. These types are in the minority, and the vast majority mouse instruments move using a downwardly oriented track ball against a surface which has an acceptably high coefficient of friction between the tracking ball and the surface on which it is moved.

A mouse instrument can typically be used on any surface, but with varying degrees of effectiveness. Usually if the surface is not smooth, or does not exhibit high friction with respect to the tracking ball, the manipulative result on the cursor will be disjunctive and much correction will need be made by the computer user to place the cursor on exactly the right point. This can be exasperating, and adversely affect work efficiency.

The use of a mouse pad will eliminate the lack of friction, but most mouse pads are un-attractive and not as well matched to manual manipulation over long periods of time. Most mouse pads are unattractive and usually bear the trademark of an unknown mouse pad or computer manufacturer. Most are drab and have muted patterns and do not add to the enhancement of the office environment.

In addition, with contemporary mouse pads, the arm is rubbed on the desk or table surface upon which the mouse pad lies. The clothing of the wearer consequently gets a good workout as the mouse is manipulated. When the mouse is not in use, it may rest on the exposed pad or be placed in a holster. The mouse pad however simply lies next to the computer collecting dust.

Contemporary mouse pads have a tendency to cause the user to lose place when moving the cursor about. When a computer stops to perform computations and temporarily shuts off the mouse input, movement of the mouse will fail to move the cursor. When this happens, the user will typically move the mouse anyway, and usually to the edge of the mouse pad. When the user re-starts movement it is difficult to "naturally" gauge the position on the mouse pad. As a result, the mouse is generally run off the pad before the user realizes it.

What is needed is a more ergonomically correct manner to use a mouse, which will help to lift the user's arm and clothing off of a desk, and which will enhance the overall use of the mouse. The needed mouse pad should naturally give feedback about the position of the mouse on the pad without the user having to take their eyes off the screen or look at the mouse and its position on the pad. Such natural feed back should occur in at least one of the directions, x or y of displacement of the mouse on the pad.

The needed mouse pad should also be configured to enable resistance of dust collection, and should contribute to the office decor when not in use.

SUMMARY OF THE INVENTION

The inclined mouse pad of the present invention is configured as a wedge, and further equipped with a working surface and a decorative surface. When not in use, the working surface can be oriented downwardly against a table to expose the non-working surfaces to view. This protects the working surface from dust and damage from dropped objects and spills.

The inclined mouse pad of the present invention provides a gravity gradient in one direction, preferably the "Y" direction to give feed back on the position of the mouse on the pad. Since the mouse pad is inclined, and preferably in a position where the height increases away from the user, several advantages are had. First, the arm is elevated rather than rubbing on the table. Second, better control is had since the user pushes upward and pulls the mouse downward.

Further, the mouse pad of the present invention has a friction surface to be used in combination with a mouse. The other surfaces are formed with a texture simulating a slice of cheese. The incline forms a wedge, and the wedge simulates a piece of cheese. A wedge typically has two rectangular faces, two triangular faces and a back face. Only one rectangular face need be supplied with the track ball friction surface. When the friction surface is turned face down, the other four faces display a cheese or other design consistency.

BRIEF DESCRIPTION OF THE DRAWINGS

The invention, its configuration, construction, and operation will be best further described in the following detailed description, taken in conjunction with the accompanying drawings in which:

FIG. 4 is a perspective view of a first embodiment of the decorative and ergonomic mouse pad of the present invention having a friction-type working surface and whose other surfaces are smooth, and having a computer mouse shown in phantom on the working surface;

FIG. 5 is a side view of the decorative and ergonomic mouse pad shown in FIG. 4 and illustrating the smooth side finish;

FIG. 6 is a bottom perspective view of the decorative and ergonomic mouse pad shown in FIGS. 4 and 5 and illustrating the rear and bottom surfaces and other side surface, all of which are smooth;

FIG. 7 is a perspective view of a second embodiment of the decorative and ergonomic mouse pad of the present invention having a friction-type working surface and whose other surfaces have a distributed aperture texture simulating cut Swiss cheese surface, and having a computer mouse shown in phantom on the working surface;

FIG. 8 is a side view of the decorative and ergonomic mouse pad shown in FIG. 7 and illustrating the distributed aperture texture; and FIG. 9 is a bottom perspective view of the decorative and ergonomic mouse pad shown in FIGS. 7 and 8, and illustrating the rear and bottom surfaces and other side surface, all of which have a distributed aperture texture;

DETAILED DESCRIPTION OF THE PREFERRED EMBODIMENT

Figure 1:
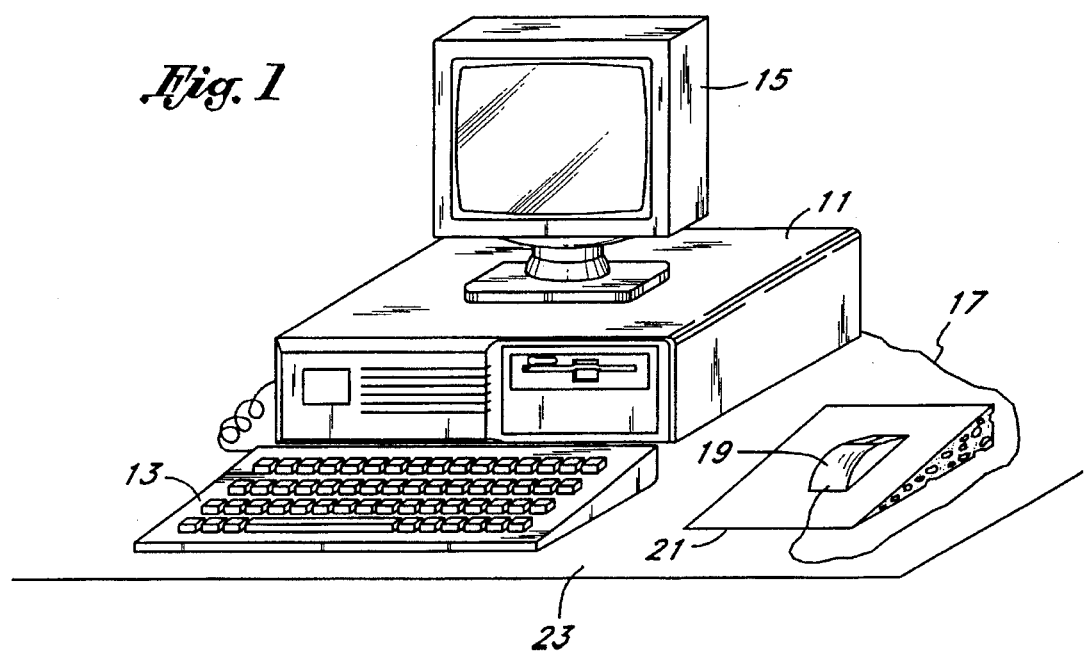
FIG. 1 is a perspective view of a typical personal computer, display and keyboard equipped with a mouse controller mounted atop the ergonomic mouse pad of the present invention.

The description and operation of the invention will be best described with reference to FIG. 1. FIG. 1 shows a personal computer 11, its keyboard 13 and monitor 15. A control cord 17 connects a conventional computer mouse 19 to the personal computer 11. The computer mouse 19 sits atop an ergonomic inclined mouse pad 21 of the present invention. All of the aforementioned structures will, during use, ideally sit atop a work surface 23.

Figure 2:
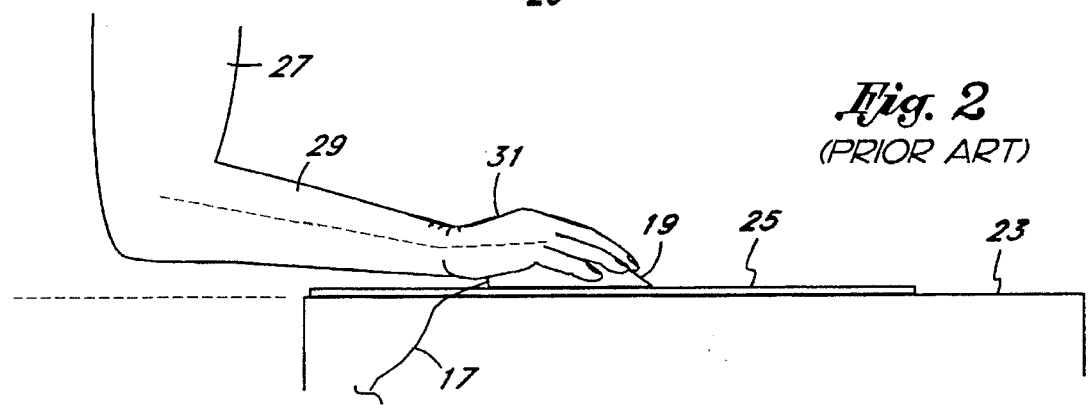
FIG. 2 is a prior art side view of a user operating a mouse controller with a conventional, flat mouse pad.

Referring to FIG. 2, the conventional use of the computer mouse 19 on a conventional mouse pad 25 is shown. The conventional mouse pad 25 is also shown as used on a flat work surface 23. The user will typically use the computer mouse 19 with one hand, and in this case, an arm 27, forearm 29 and hand 31 is shown. Note the non-linearity between the forearm 29 and hand 31 as accentuated by the angled dashed line.

Figure 3:
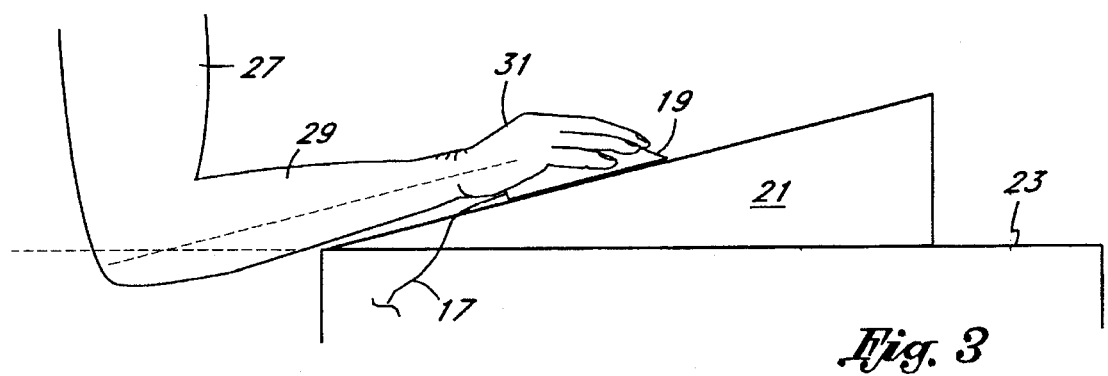
FIG. 3 is a side view of a user operating the ergonomic mouse pad of the present invention and illustrating the linear relationship between the hand and wrist.

Referring to FIG. 3, the use of the computer mouse 19 on the inclined mouse pad 21 of the present invention is shown. The inclined mouse pad 21 of the present invention is also shown as used on a flat work surface 23. The user will also typically use the computer mouse 19 with the inclined mouse pad 21 of the present invention with one hand, and in this case, arm 27, forearm 29 and hand 31 is again show. Note the linearity between the forearm 29 and hand 31 as accentuated by the straight dashed line.

Referring to FIGS. 4–6, an expanded view of the inclined mouse pad 21 of the present invention is shown. The inclined mouse pad 21 has a rectangular working surface 33, a left side surface 35, a right side surface 37, and a back surface 39. The other rectangular surface 43 is face down when the mouse pad 21 is in working position.

The working surface 33 has a lower edge 45 and an upper edge 47. Working surface 33 has a textured surface and is designed to maximally engage the track ball of a computer mouse. As shown in FIGS. 4–6, the texture of the non-working surfaces 35, 37, 39, and 43 are configured to be smooth, and may be colored to simulate American or cheddar cheese. These surfaces are molded and colored to be very realistic. Other sizes, and variations on the overall wedge shape are possible, with associated texture and color, but the wedge shape is the preferred shape both for space savings and for utility.

Ideally, the inclined mouse pad 21, as well as the pads 51 and 71 which will be shown, will have a length from the lower edge 45 to the upper edge 47 of about eleven inches. The mouse pad 21 is ideally about seven inches wide. The height of the back surface 39 will range from about two and a half to about three inches tall. This will of course depend upon the length from the lower edge 45 to the upper edge 47. For the dimensions just given, the angle of the working surface 33 with respect to horizontal is about 12 degrees for a back surface of two and a half inches tall. The angle of the working surface 33 with respect to horizontal is about 14.5 degrees for a back surface of three inches tall. The dimensions may vary completely, and the angles may range from as little as 4 degrees up to and including 30 degrees. These angles can help to accommodate work surfaces 23 which may be tilted, such as drafting tables and the like, as well as to suit the working preferences of users.

The bulk of the body of the mouse pad 21 will preferably be molded of dense neoprene or the like. The working surface 33 will be made of a layer of hard plastic, and of a suitable thickness which, when combined with the structural stability of the dense neoprene, will provide a sufficiently rigid surface to fully support the computer mouse 19.

Referring to FIGS. 7–9, an expanded view of a second embodiment of the inclined mouse pad of the present invention is shown as inclined mouse pad 51. The inclined mouse pad 51 has a rectangular working surface 33 identical to that for mouse pad 21, a left side surface 55, a right side surface 57, and a back surface 59. The other rectangular surface 61 is face down when the mouse pad 51 is in working position.

As shown in FIGS. 4–6, the texture of the non-working surfaces 55, 57, 59, and 61 are configured to have a random series of distributed apertures 65, configured to have a texture simulating a cut Swiss cheese surface. The apertures 65 will have a mean size of from about one sixteenth of an inch across and deep to about one half of an inch across and deep. The apertures are preferably molded simultaneously with the formation of the portion of the mouse pad 51 which does not contain working surface 33. Note that in the drawings of FIGS. 7, 8, and 9 that the working surface 33 is the same. Working surface 33 will be textured for maximum friction with respect to a mouse 19's track ball.

Figure 10:
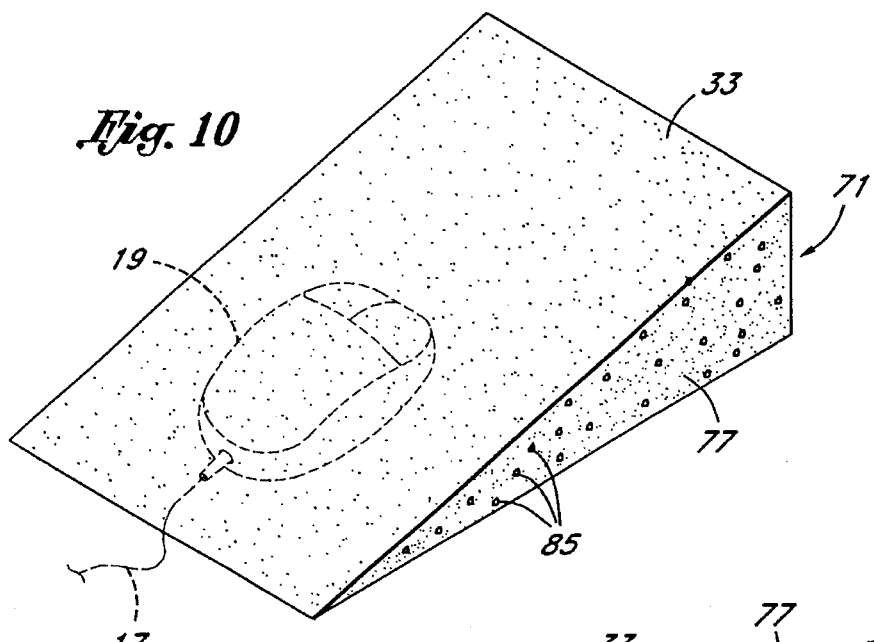
FIG. 10 is a perspective view of a third embodiment of the decorative and ergonomic mouse pad of the present invention having a friction-type working surface and whose other surfaces have a distributed aperture texture simulating cut blue cheese surface, and having a computer mouse shown in phantom on the working surface.
Figure 11:
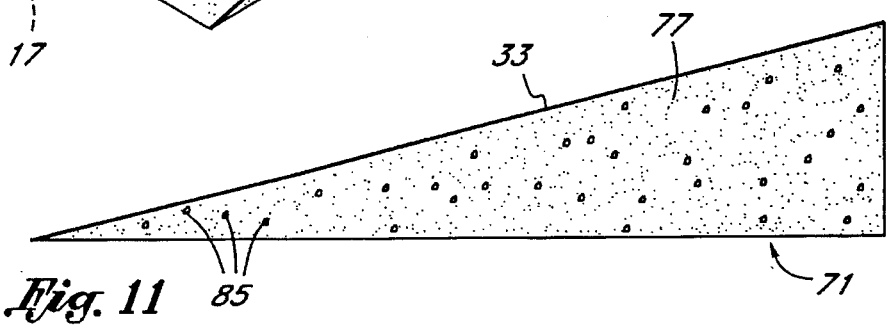
FIG. 11 is a side view of the decorative and ergonomic mouse pad shown in FIG. 10 and illustrating the distributed aperture texture.
Figure 12:
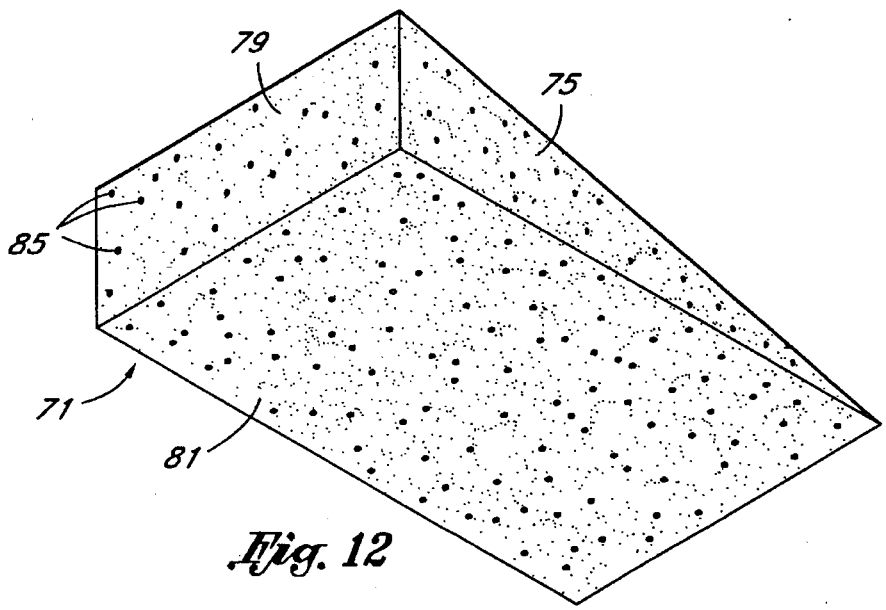
FIG. 12 is a bottom perspective view of the decorative and ergonomic mouse pad shown in FIGS. 10 and 11, and illustrating the rear and bottom surfaces and other side surface, all of which have a distributed aperture texture.

Referring to FIGS. 10–12, an expanded view of a third embodiment of the inclined mouse pad of the present invention is shown as inclined mouse pad 71. The inclined mouse pad 71 has a rectangular working surface 33, a left side surface 75, a right side surface 77, and a back surface 79. The other rectangular surface 81 is face down when the mouse pad 71 is in working position.

As shown in FIGS. 10–12 the texture of the non-working surfaces 75, 77, 79, and 81 are configured to have a random series of distributed smaller apertures 85, configured to have a texture simulating a blue cheese surface. Smaller apertures 85 have a size of from about one thirty second of an inch across and deep up to about one eighth of an inch across and deep. The apertures are preferably molded simultaneously with the formation of the portion of the mouse pad 71 which does not contain working surface 33. Note that in the drawings of FIGS. 10, 11, and 12 that the working surface 33 is the same. Working surface 33 is again be textured for maximum friction with respect to a mouse 19's track ball.

While the present invention has been described in terms of an inclined mouse pad with working and decorative surfaces, one skilled in the art will realize that the structure and techniques of the present invention can be applied to many structures. The present invention may be applied in any situation where an advantageous and multi-utilitarian object is to be provided to give advantages of use combined with advantages of design.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. An inclined mouse pad comprising:
    a wedge shaped body having a first rectangular surface having a lower edge and an upper edge higher than said lower edge, a pair of side surfaces, and a back surface, said first rectangular surface having a texture for frictionally engaging the track ball of a computer mouse, said wedge shaped body defining a second rectangular surface of substantially the same dimension as said first rectangular surface.

2. A combination mouse pad and mouse, and including the mouse pad recited in claim 1, and further comprising a computer mouse bearing upon said first rectangular surface.

3. The mouse pad as recited in claim 1 wherein said second rectangular surface and said first rectangular surface meet along said lower edge.

4. The mouse pad as recited in claim 3 wherein said second rectangular surface and said first rectangular surface form an angle of from about 6 degrees to about 20 degrees.

5. The mouse pad as recited in claim 1 wherein said second rectangular surface, pair of side edges and back edge have matching texture to enable said first rectangular surface to be turned downward to give the impression of a homogeneous body of uniform texture.

6. The mouse pad recited in claim 3 wherein said upper edge is from about 1.5 to about 4.0 inches higher than said lower edge.

7. The mouse pad recited in claim 1 wherein said side surfaces are triangular shaped.

8. The mouse pad of claim 2 wherein each of said side surfaces are triangular shaped.

9. A combination mouse pad and mouse, and including the mouse pad recited in claim 5, and further comprising a computer mouse bearing upon said first rectangular surface.

10. The mouse pad as recited in claim 2 wherein said planar area of material has a first edge and a second edge parallel to said first edge and said first edge, and wherein said bottom surface has a forward edge adjacent said first edge of said planar area of material.

11. The mouse pad as recited in claim 10 wherein said bottom surface and said planar area of material form an angle of from about 6 degrees to about 20 degrees.

12. The mouse pad recited in claim 10 wherein said second edge is from about 1.5 to about 4.0 inches higher than said first edge.

13. An inclined mouse pad comprising:
    a wedge shaped support having, a top surface, a pair of side surface, a back surface, and a bottom surface, said pair of side surfaces, a back surface, and bottom surface have a decorative texture; and
    a planar area of material having a first side having a texture for frictionally engaging the track ball of a computer mouse and a second side affixed to said top surface of said wedge shaped support.

14. The inclined mouse pad of claim 9 wherein said decorative surface further comprises a series of distributed apertures.

15. The inclined mouse pad of claim 14 wherein said series of distributed apertures have a mean size of from about one sixteenth of an inch across and deep to about one half of an inch across and deep, to enable said mouse pad to be oriented with said first side of said planar material downward and give the appearance of having a homogeneous surface.

16. The inclined mouse pad of claim 14 wherein said series of distributed apertures have a mean size of from about one thirty second of an inch across and deep up to about one eighth of an inch across and deep, to enable said mouse pad to be oriented with said first side of said planar material downward and give the appearance of having a homogeneous surface.

17. A combination mouse pad and mouse, and including the mouse pad recited in claim 16, and further comprising a computer mouse bearing upon said first side of said planar area of material.

18. A combination mouse pad and mouse, and including the mouse pad recited in claim 13, and further comprising a computer mouse bearing upon said first side of said planar area of material.

* * * * *